United States Patent

[11] 3,604,434

[72] Inventor Mowatt M. Hurst
  Menlo Park, Calif.
[21] Appl. No. 809,182
[22] Filed Mar. 21, 1969
[45] Patented Sept. 14, 1971
[73] Assignee Malsbary Manufacturing Company
  Oakland, Calif.

[54] AUTOMATIC CARWASH APPARATUS
  10 Claims, 13 Drawing Figs.
[52] U.S. Cl. .................................................. 134/58,
  104/93, 134/95, 134/123, 134/181
[51] Int. Cl. ............................................................ B60s 3/04
[50] Field of Search ............................................ 134/45,
  123, 180, 181; 15/DIG. 2; 239/184, 185; 104/93

[56] References Cited
UNITED STATES PATENTS

| | | | |
|---|---|---|---|
| 2,676,600 | 4/1954 | Vani et al. | 134/123 |
| 2,703,579 | 3/1955 | Merancy et al. | 134/123 X |
| 3,012,564 | 12/1961 | Dick | 134/123 X |
| 3,187,359 | 6/1965 | Takeuchi | 15/DIG. 2 |
| 3,288,109 | 11/1966 | Smith | 134/123 |
| 3,315,691 | 4/1967 | Widner | 134/123 X |
| 3,339,565 | 9/1967 | Williams | 134/123 X |
| 3,398,755 | 8/1968 | Hudson et al. | 134/123 X |

FOREIGN PATENTS

| | | | |
|---|---|---|---|
| 251,427 | 2/1964 | Australia | 134/123 |
| 375,182 | 6/1932 | Great Britain | 134/123 |
| 961,509 | 4/1957 | Germany | 134/123 |
| 965,612 | 8/1964 | Great Britain | 134/123 |
| 1,076,135 | 7/1967 | Great Britain | 134/123 |

*Primary Examiner*—Daniel Blum
*Attorney*—Schapp and Hatch

ABSTRACT: An automatic carwash apparatus having a carriage moving along a track mounted in spaced relation to the car. Positive stops halt the carriage at the ends of the track and limit switches reverse the movement of the carriage at the ends of the track. A spray head is attached to the carriage and equipped with spray nozzles in an L-shaped pattern oriented to spray the sides, ends and upper surfaces of the car as the carriage moves along the track. Alternate forms are shown with the track at ground level and with the track above the roof level of the car. Two of the forms shown have a single track, and two forms have a pair of tracks each surrounding half the circumference of the car.

INVENTOR.
MOWATT M. HURST
BY
Schapp & Hatch
ATTORNEYS

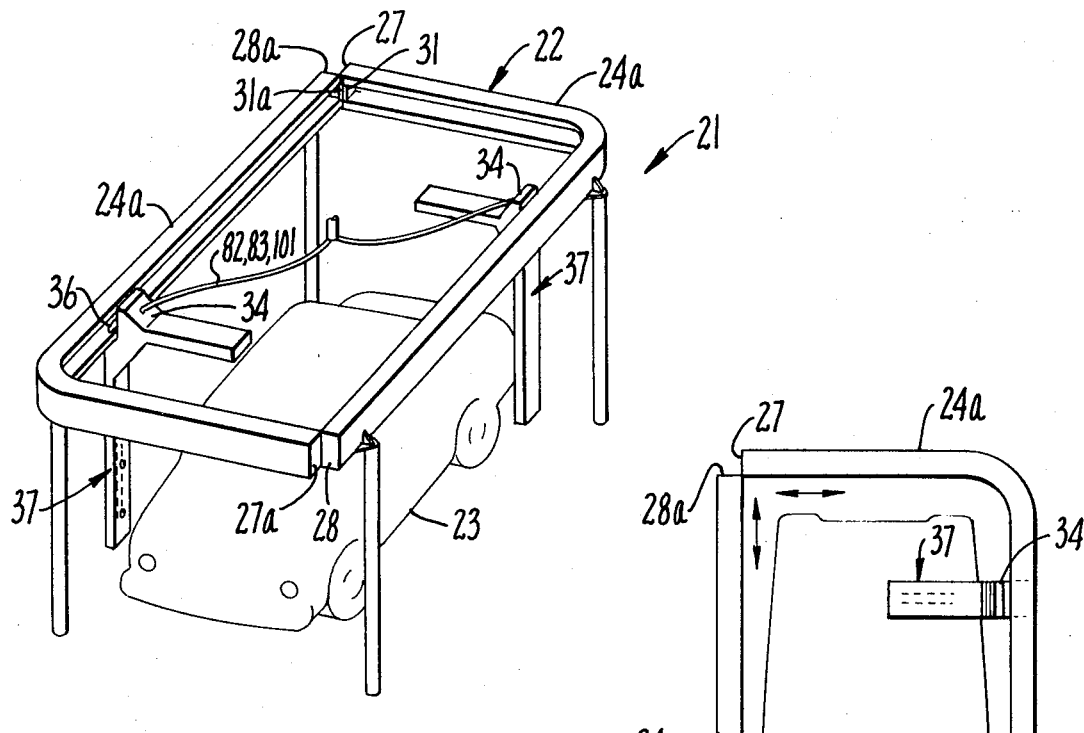
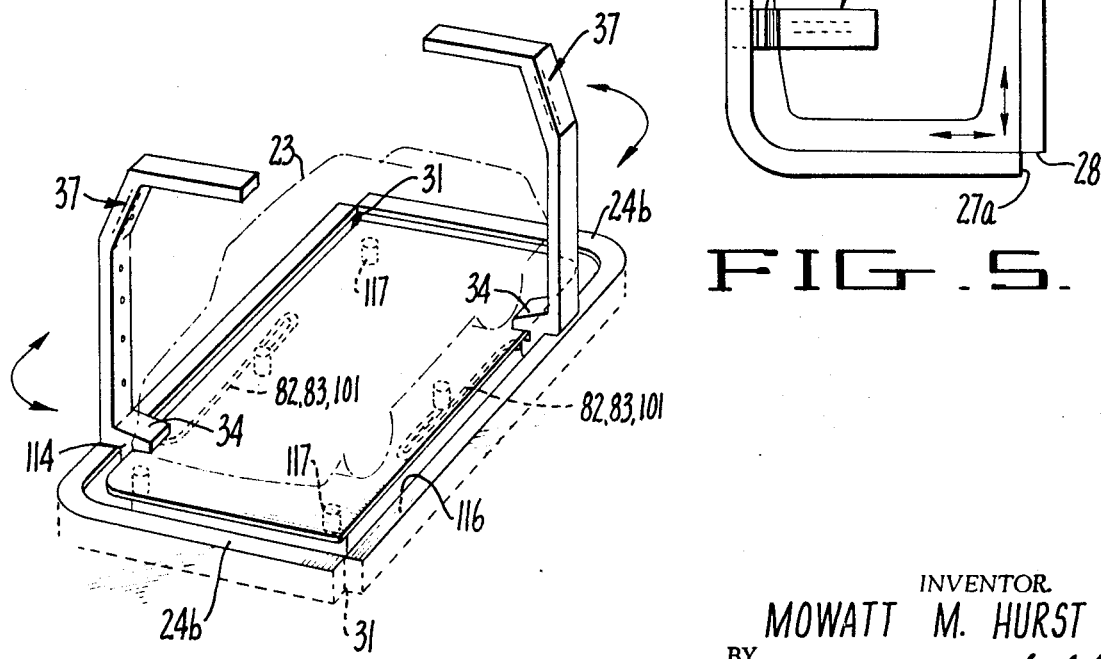

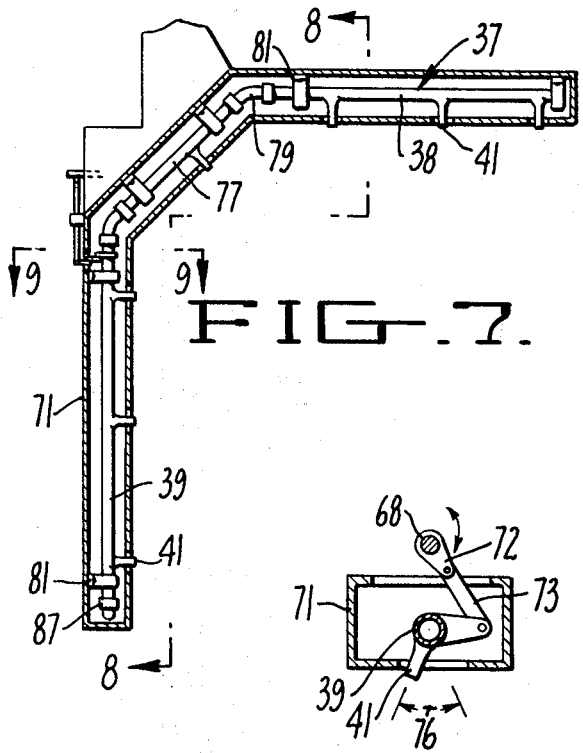
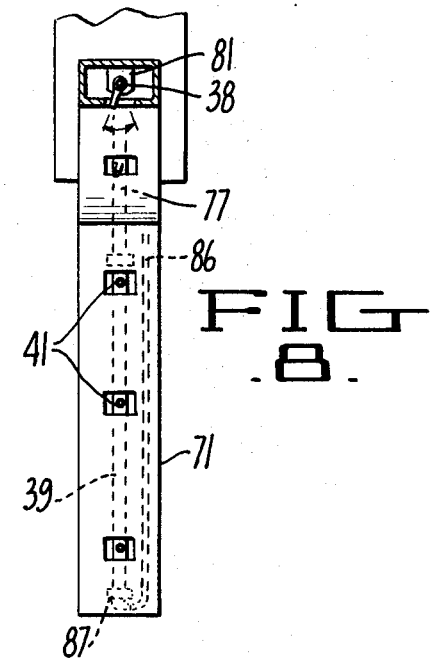
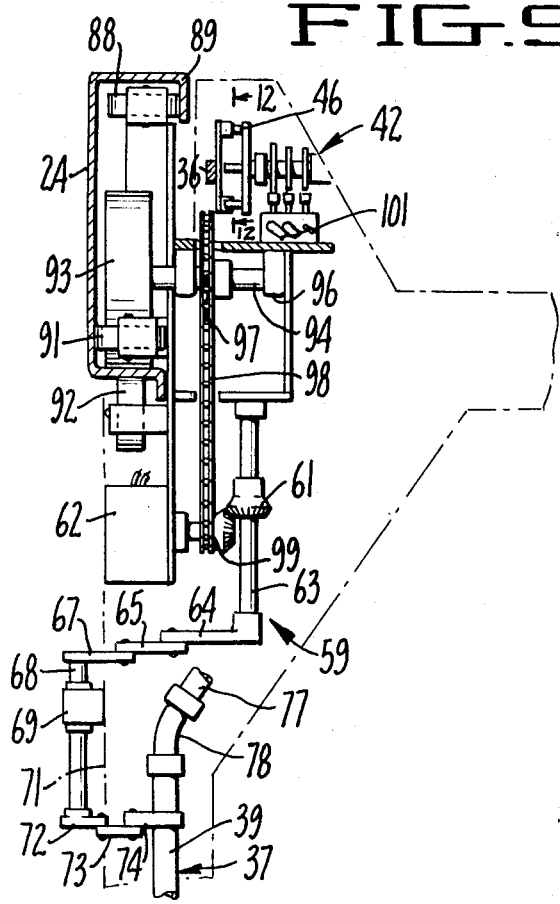
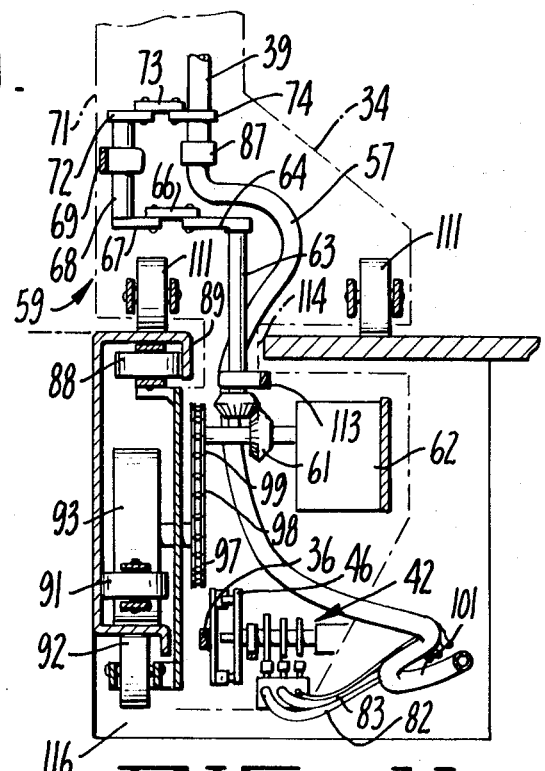

3,604,434

AUTOMATIC CARWASH APPARATUS

CROSS-REFERENCES TO RELATED APPLICATIONS

This application is related to my copending application, Ser. No. 720,767, filed Apr. 12, 1968 and entitled AUTOMATIC CARWASH APPARATUS the benefit of the filing date of which is claimed as to any invention common to both applications.

BACKGROUND OF THE INVENTION

This invention relates to improvements in AUTOMATIC CARWASH APPARATUS, and more particularly to carwash apparatus wherein cleaning is effected by impinging sprays of cleaning liquids and rinsing liquids against the vehicle from a spray carriage traversing an oblong track generally surrounding the vehicle.

Apparatus for washing automotive vehicles is ordinarily classified into manually and automatically operated types. Until comparatively recently, automatic carwashes have generally involved moving the vehicle through a wash tunnel, where it was sprayed with a cleaning liquid, passed between revolving brushes to scrub off dirt, rinsed off and at least partially dried in a blast of heated air. Manually operated carwashes, on the other hand, have involved spraying a cleaning liquid onto the vehicle, scrubbing the vehicle surface with a hand mitt, sponge or the like, spraying the vehicle with a rinse liquid and wiping off most of the liquid with a chamois or towel.

Recently, improved detergent cleaning compounds and water conditioners have become available which make it possible to eliminate the scrubbing step, and which allow the car to dry naturally without spotting, eliminating the drying step. With the drying and scrubbing steps eliminated, a carwash apparatus can be provided which cleans the car solely by the spraying of cleaning and rinsing liquids against the surfaces to be cleaned, the vehicle drying with or without air blast. A greatly simplified automatic apparatus results, the apparatus being especially suited for unattended operation and consequent decreased labor cost and turn around time.

Known spray-type carwash devices usually consist of a spray arch which passes longitudinally over the vehicle, see Fisher U.S. Pat. No. 2,699,792, or a spray carriage which moves along an oblong track positioned in surrounding relation to the vehicle, see Tompkins U.S. Pat. No. 2,896,857. In either type of apparatus, problems are encountered in achieving effective cleaning action on the more difficult to clean portions of the car without wasting too much liquid on the more easily cleaned areas.

A further problem with the prior art devices involves the necessity for a swiveling liquid and electrical connection, in the line supplying power and liquid to the carriage, which is capable of following the movement of the carriage. Such connections are expensive and they impair the reliability of the apparatus. While this problem may be met by eliminating the swivel connection and providing a carriage which reciprocates along the track rather than following a continuous circling path, further problems are encountered with the carriage overrunning the desired halting points.

SUMMARY OF THE INVENTION

The present invention employs a carriage riding on a two-ended track, reciprocating from one end of the track to the other and back. The track surrounds a portion of the periphery of the car, so that the spray manifold borne by the carriage will project spray against the desired portions of the car as the carriage traverses the track. Since the carriage does not move in a continuous encircling path, swivel structures need not be used for the electrical and liquid connections, and the resulting simplification of structure enhances the trouble-free performance of the apparatus.

Positive stops at the ends of the path of travel of the carriage trigger the reversal of carriage motion and entirely eliminate carriage overrun past the proper reversal points. In some prior designs, should the reversing mechanism fail to actuate when the limit switch is tripped, the carriage can overrun the stop and either actuate the limit switch intended to stop it at the other extremity, or merely continue on without the desired reversal. In either event, the carriage would continue forward, causing problems with the power and liquid supply lines and disturbing the timing of the changes in spray liquid and spray pattern. With the positive stops and positive reversal of the present invention, such mistiming and damage to the supply lines is made impossible regardless of any failure of the switching mechanisms, as the carriage cannot physically be driven beyond the stop, whether the motor is reversed or not.

In equipment of the present type, increased speed of operation results in a significant increase in revenue, as more cars are washed in a given time, and long waiting lines are eliminated. Though the speed of the washing process may be increased by putting another spray carriage on the track, problems arise in synchronizing movements of the two carriages sharing the same track. Such problems may be solved, but it is advantageous to eliminate the problem altogether by providing a separate track for each carriage. The movements of the two carriages can thus be entirely independent of each other with no danger of interference or improper synchronism. Since both tracks are two-ended and have positive stops with positive carriage reversal, neither spray carriage can affect the operation of the other.

Accordingly, it is a principal object of the present invention to provide automatic carwash apparatus of the character described which is capable of cleansing and rinsing the exterior surface of an auto in a rapid and efficient manner.

It is a further principal object of the present invention to provide an automatic carwash apparatus of the character described which eliminates the need for electrical and plumbing swivel structures, for greater reliability and economy.

Yet another object of the present invention is to provide an automatic carwash apparatus of the character described in which carriage overrrun of the desired stop points and attendant synchronism problems are entirely eliminated.

A still further object of the present invention is to provide an automatic carwash apparatus of the character described having a positive reversal of the carriage motion.

Yet another object of the present invention is to provide an automatic carwash apparatus of the character described having increased resistance to vandalism and tampering.

Another object of the present invention is to provide an automatic carwash of the character described in which two spray carriages may be employed without interference with each other.

Further objects and advantages of the present invention will appear as the specification proceeds, and the new and useful features of the automatic carwash apparatus will be fully defined in the claims attached hereto.

BRIEF DESCRIPTION OF THE DRAWINGS

The preferred form of the present invention is illustrated in the accompanying drawings forming part of this specification, in which:

FIG. 4 is a perspective view of a third embodiment of the carwash of the present invention.

FIG. 5 is a plan view of the carwash of FIG. 4.

FIG. 6 is a perspective view of a fourth embodiment of the carwash of the present invention.

FIG. 7 is an enlarged partial cross-sectional view taken approximately along the planes of lines 7—7 of FIG. 1 with portions of the apparatus shown broken away for clarity, FIG. 8 is a view partially in cross section taken approximately along the planes of lines 8—8 of FIG. 7.

FIG. 9 is a cross-sectional view on an enlarged scale taken approximately along the planes of lines 9—9 of FIG. 7.

FIG. 10 is an enlarged fragmentary cross-sectional view taken approximately along the planes of line 10—10 of FIG. 1 with parts broken away for clarity.

FIG. 11 is an enlarged fragmentary cross-sectional view taken approximately along the planes of lines 11—11 of FIG. 3, with parts broken away for clarity.

While only the preferred forms of the present invention have been shown, it should be understood that various changes or modifications may be made within the spirit of the claims attached hereto without departing from the spirit of the invention.

DESCRIPTION OF THE PREFERRED EMBODIMENT

Figure 1:
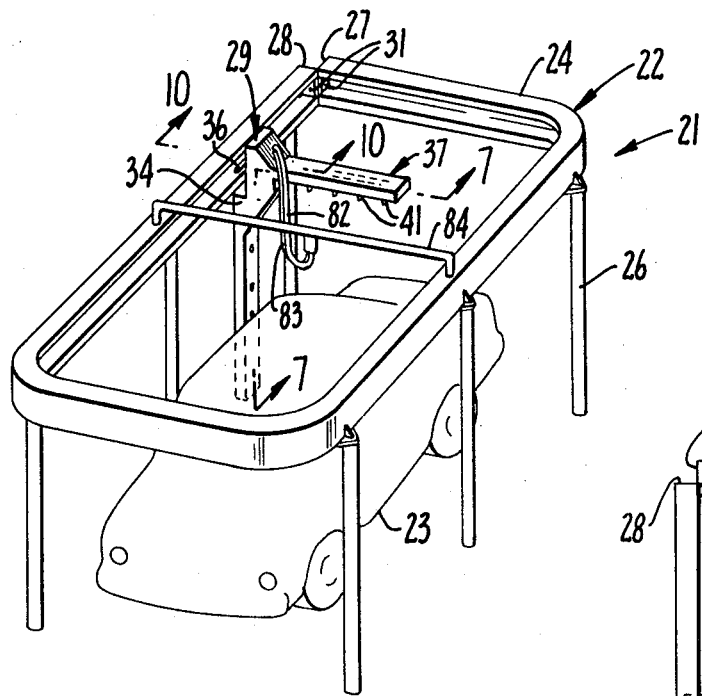
FIG. 1 is a perspective view of a carwash constructed in accordance with the present invention.
Figure 12:
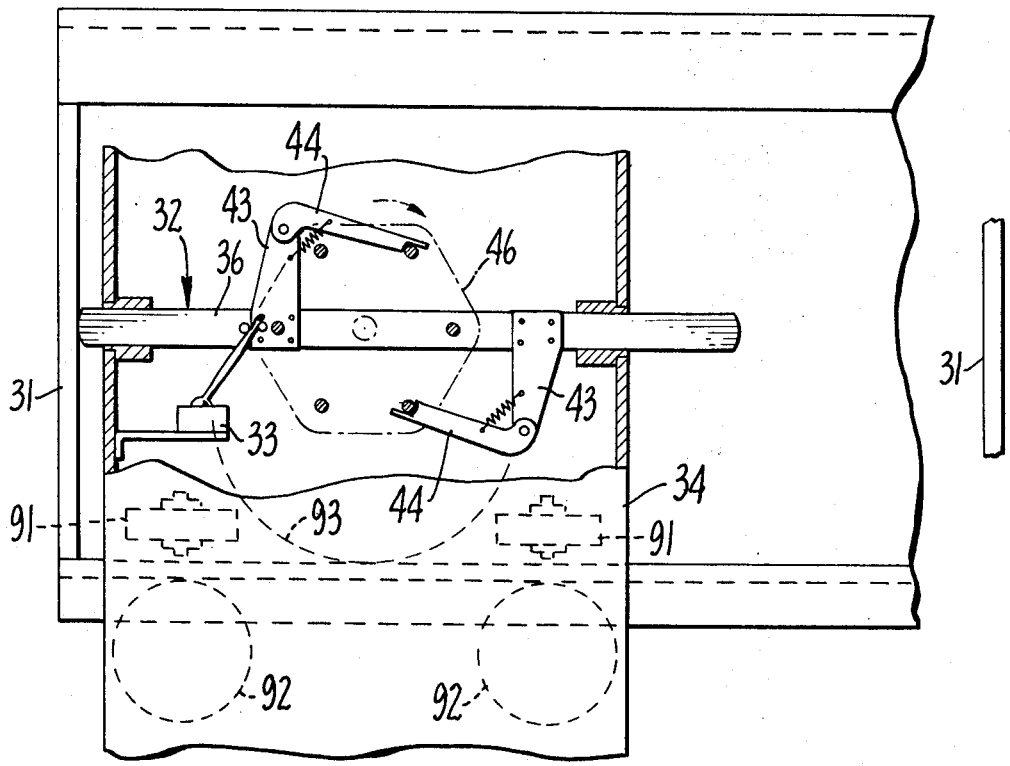
FIG. 12 is an enlarged fragmentary cross-sectional view taken approximately along the planes of lines 12—12 of FIG. 10.

Referring to the drawings in detail, it well be seen that the automatic carwash apparatus 21 of the present invention includes a guide means 22 mounted in spaced relation to a portion of the periphery of a car 23 to be washed. As shown in FIG. 1, the guide means 22 includes a track 24 supported on standards 26 and having two ends, 27 and 28. Spray means 29 is mounted for traversing movement along the guide means 22 and track 24 and is formed for directing a spray of liquid against the car 23. A positive stop means 31 is mounted adjacent each end of the guide means 22 and is formed for halting movement of the spray means 29 along the track 24 as the spray means 29 moves from one end 27 to the other 28 and back along the guide means 22. The spray means 29 carries with it means for reversing the direction of travel of the spray means 29 along the guide means 22, generally indicated as 32 in FIGS 12 and 13, upon encounter of the spray means 29 with the positive stop means 31.

The means 32 for reversing the direction of travel of the spray means 29 includes a limit switch 33 actuated by movement of the spray means 29 with respect to the guide means 22 and track 24 in the vicinity of the positive stop means 31. The spray means 29 is supported on a carriage 34 which moves along the guide means 22, and as here shown the limit switch 33 is mounted within the carriage 34 and comprises a toggle switch actuated by sliding movement of a bar 36 which is in turn moved relative to the carriage 34 upon contact with the positive stop means 31. At the point in time illustrated by the position of the parts in FIGS. 12 and 13 the bar 36 has just been driven fully to the right as shown in those figures to actuate the limit switch 33 to cause the carriage 34 to be driven to the right, away from the positive stop means 31 as seen on the left in FIG. 12. While the limit switch 33 has been shown here mounted within the carriage 34, it should be appreciated that it could be mounted anywhere adjacent each end 27, 28 of the guide means 22, where it would be actuated by the movement of the carriage 34 approaching such end.

The spray means 29 includes a generally L-shaped manifold 37 attached to the carriage 34 and disposed with one arm 38 of manifold 37 extending above a portion of the car 23 and the other arm 39 of the manifold 37 disposed generally parallel to the side of the car 23. The manifold 37 bears spray nozzles 41 along both of the arms 38 and 39 communicating with the manifold 37 to direct liquid sprays against the car 23. The spray means 29 is formed for directing a plurality of liquids through the spray against the car 23, such as a detergent solution followed by clear rinse water. Other fluids, such as a preconditioner solution or a wax solution may be applied through the spray means as well. A control means generally indicated as 42 is provided, responsive to the traversing movement of the spray means 29 along the guide means 22 to control the sequence of application of the different spray solutions through the spray means 29.

Figure 13:
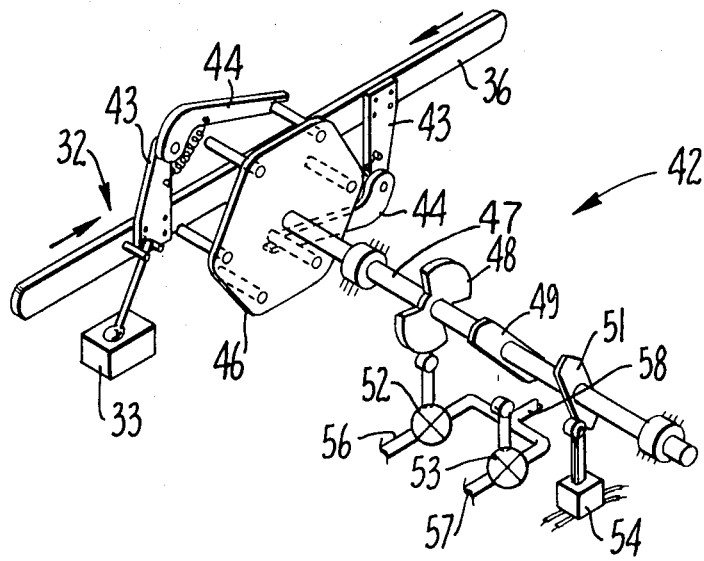
FIG. 13 is a perspective view of the ratchet, star wheel and camshaft apparatus shown in FIGS. 10 and 12.

As shown in FIG. 13, the control means 42 operated by the same reciprocating bar 36 which operates the reversing means 32. A pair of brackets 43 are mounted on the bar 36, and a ratchet lever 44 is pivotally attached to each bracket 43. The ratchet levers 44 engage the pins of six-pointed star wheel 46 which is borne by a shaft 47. Springs 48 bias each of the ratchet arms 44 toward the ends of the star wheel 46. Thus on each reciprocation of the bar 36, one of the ratchet arms 44 will be engaged with a pin of the star wheel 46 to advance the star wheel one-sixth of a revolution while the opposite ratchet arm 44 will be dragged across pin on the opposite side of the star wheel 46. At the limit of travel of the bar 36, the dragged ratchet arm 44 falls into place behind a pin and is engaged so that it will advance the star wheel 46 an additional one-sixth revolution upon the return of the bar 36 to its original position.

Cams 48, 49 and 51 are attached to the shaft 47 for rotation upon rotation of the star wheel 46. Cam 48 is engaged with the follower of a cam-actuated valve 52 and cam 49 is engaged with the follower of the cam actuated valve 53. The valve 52 is applied with clear rinse liquid from a conduit 56, and the valve 53 is supplied with wash solution from a conduit 57. The output of both valve 52 and valve 53 are connected to a conduit 58 leading to the manifold 37. The cam 51 contacts the follower of a cam-actuated switch 54, which interrupts the supply of power to the carwash apparatus at the end of a completed wash and rinse cycle. As here shown, the cams 48 and 49 are arranged for a cycle in which the spray means 29 travels from one end to the other of the track 24 while wash liquid is supplied, and then travels from the other end of the track 24 to the first end and back to the other end, that is, makes two trips around the car 23 while the rinse liquid is supplied. For this purpose, the two dwell periods of cam 48 are 120° each and the two dwell periods of the cam 49 are 60° each, with the cams 48 and 49 arranged 90° apart in phase. One complete cycle of washing followed by rinsing occurs for each one-half revolution of the star wheel 46. At the end of one-half revolution of the star wheel 46, one of the two short dwell areas of the cam 51 is brought into engagement with the follower of the switch 54 to shut down the apparatus.

The spray means 29 is formed for changing the angle at which the spray of liquid is directed against the surface of the car 23 in a reciprocating fashion through the operation of an oscillator mechanism generally indicated as 59 in FIG. 10. The oscillator mechanism 59 is essentially similar to that disclosed in my copending application Ser. No. 720,767, cited above, and includes a pair of bevel gears 61 driven by the carriage drive motor 62. The bevel gears 61 in turn drive a shaft 63 having an arm 64 attached to its end. The arm 64 is pivotally attached to a link 66 which is in turn pivotally attached to an arm 67 mounted on the end of a countershaft 68. The countershaft 68 is journaled through a bearing 69 mounted on the housing 71 of the carriage 34. An arm 72 is attached to the opposite end of the counter shaft 68 and pivotally attached to a link 73 which is in turn pivotally attached to an arm 74 mounted on the vertical arm 39 of the spray manifold.

The operation of the oscillator mechanism 59 produces the reciprocatory motion illustrated by the arrows 76 in FIG. 9. The vertical arm 39 of the spray manifold is connected to a slant section 77 of the manifold through a flexible joint 78, which is capable for transmitting the torsional force. The slant section 77 is in turn connected to the horizontal arm of the spray manifold 38 through another flexible joint 79 so that the slant section 77 and the horizontal section 38 of the spray manifold share in the reciprocatory motion. The manifolds 38, 39 and 77 are borne within the housing 71 by bearing supports 81 which permit the reciprocatory motion while supporting the manifolds.

The wash and rinse fluids are supplied to the spray means 29 through a pair of hoses 82 and 83 leading from the supply arch 84 which spans the track 24. The hoses 82 and 83 are connected within the carriage 34 to the conduits 56 and 57. The outlet conduit 58 from the valves 52 and 53 communicates with a conduit 86 as shown in FIG. 8, which leads to the bottom of the vertical arm 39 of the spray manifold 37. Conduit 86 is connected to the lower end of the spray manifold arm 39 through a rotary-seal joint 87 which allows the conduit 86 to remain stationary while the spray manifold arm 39 reciprocates about its axis.

The carriage 34 and manifold 37 carried by it are suspended from the track 24 through a drive and suspension system which includes a guide roller 88 journaled on the carriage 34 and bearing a depending lip 89 of the track 24, a pair of guide rollers 91 bearing on the inside of the track 24, and a pair of guide rollers 92 bearing on the bottom edge of the track 24. The carriage 34 is driven along the track 24 by a drive wheel 93 which bears on the inside of the lower edge of the track 24.

The drive wheel 93 is mounted on a shaft 94 which is in turn journaled in bearings 96 mounted on the carriage 34. A sprocket 97 is mounted on the shaft 94 and engaged with a roller chain 98 which is in turn engaged with a sprocket 99 mounted on the drive shaft of the motor 62. The motor 62 is appropriately supplied with power which is switched by the cutoff switch 54 and a reversing limit switch 33 from a power supply cable 101 leading from the supply arch 84 to the carriage 34 along with the hoses 82 and 83.

Figure 2:
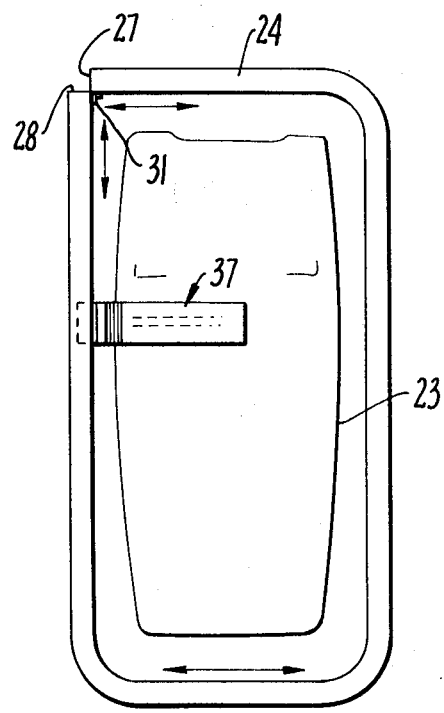
FIG. 2 is a plan view of the carwash of FIG. 1.

Turning now to the embodiment depicted in FIG. 3, the carwash there shown is essentially the same in operation as the carwash of FIGS. 1 and 2 except that the track 24 is relocated to a horizontal plane below the level of the roof of the car, in fact, to ground level. As here shown, the spray means 29 stands upwardly from the carriage 34, which is located at the lower end of the vertical arm 39 of the manifold 37. The carriage 34 is engaged with the track 24 in essentially the same fashion as in the embodiment of FIGS. 1, 2 and 10.

Figure 3:
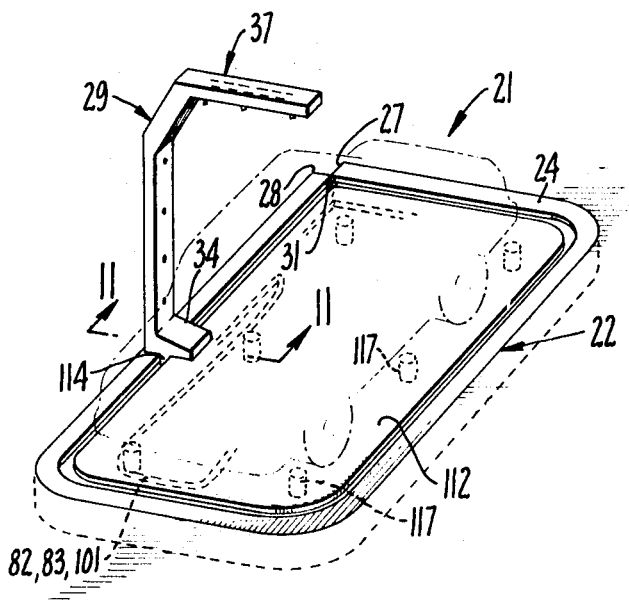
FIG. 3 is a perspective view of another embodiment of the carwash of the present invention and showing the outline of the automobile to be washed in phantom.

In FIG. 11, which shows a cross section of the carriage 34 in the embodiment of FIG. 3, those parts which are essentially the same as in the embodiment of FIGS. 1 and 10 have been given the same numbers. In this embodiment additional rollers 111 are added to accommodate the changed pattern of loading. One of the rollers 111 rides on the top of the track 24, and the other roller 111 bears on the outer edge of the support platform 112 which occupies the center of the course of the track 24. The reversing means 32, the control means 42 and the oscillator mechanism 59 are essentially the same as in the embodiment of FIG. 1 and 10.

An additional bearing 113 is provided for the shaft 63 and the conduit 86 is eliminated, with the vertical arm 39 of the manifold 37 being supplied directly from the conduit 57 through the rotary seal joint 87. Although the conduit 57 is here shown as a flexible member, it should be appreciated that there is no requirement that the conduit 57 be flexible, as all motion of the manifold 37 occurs above the rotary joint 87. The shaft 63 and the conduit 57 both pass through a narrow neck portion 114 of the carriage 34 which passes along the gap between the depending lip 89 of the track 24 and the support platform 112. The supply hoses 82 and 83 and the power supply cable 101 pass along a trough 116 lying immediately within the ambit of the track 24 and partially beneath the support platform 112. Since the hoses and the power supply cable pass along the trough 116, the support platform 112 may be borne either by a series of support pillars 117 as shown in FIG. 3 or rest for most of its area on a slab foundation. This form of the invention has the advantage of a neater and less cluttered appearance and reduces vulnerability to vandal attack.

Turning now to the embodiment of the invention shown in FIGS. 4 and 5, a form of the carwash 21 is shown in which the guide means 22 comprises a plurality, here two, of two-ended tracks 24a, with each of the tracks generally encircling a portion of the circumference of the car 23. The spray means 29 includes a pair of carriages 34, one on each of the tracks 24a, and each of the carriages 34 has a manifold 37 mounted on it to spray the car 23. The two carriages 34 each travel along their respective tracks 24a reciprocating from end to end thereof in the same fashion as the carriages 34 of the two preceding embodiments.

The prime advantage gained in this form of the invention lies in the increased speed of operation. The use of two carriages 34 and manifolds 37 approximately halves the amount of time taken to clean the automobile 23. Since the two units on their separate tracks 24a are essentially independent of each other, no problems of synchronism between the operations of the two units should arise. Should one unit advance slightly ahead of the other unit in its operations, it will merely reach the end of its cycle of operation and stop, and the other unit will subsequently reach the end of its cycle of operation and likewise stop.

Although synchronism between the two units is not vital, it is preferred to operate the units in such a fashion that they remain approximately symmetrically opposite each other on their respective tracks, to avoid any problems arising upon simultaneous arrival of both units at a common corner. The common corners are those which the ends of the track meet, such as the upper corner in FIG. 4, at which 27 of the right-hand track and 28a of the left-hand track, and the lower corner in FIG. 4, at which end 28 of the right-hand track meets end 27a of the left-hand track. Each of the ends 27, 28, 27a and 28a is equipped with a positive stop means 31, 31a, which are essentially the same as the positive stop means 31 shown in FIG. 1. The lower corner of FIG. 4 at which ends 28 and 27a meet is equipped with positive stop means 31 which are concealed in that view.

The details of the reversing means 32, manifolds 38, 39 and 77, and of the control means 42 and the oscillator mechanism 59 are essentially the same as those shown in the embodiment of FIG. 1, with a complete set of those mechanisms being carried within each of the carriages 34 and manifolds 37. While only two tracks 24a have been shown in this embodiment, it should be appreciated that as many segments of track 24 may be used as desired, and that additional segments may prove advantageous. For instance, the employment of four travelling units including carriages 34 and manifolds 37 on four segments of track 24 would produce an even more rapid cleaning cycle, with the additional possibility of slowing down those units covering the front and ends of the car to receive additional cleaning action on those more difficult to clean areas. Alternatively, with a four-segmented track 24 all travelling units could operate at a common speed, with those travelling units covering the ends of the car making more passes across those areas during a cycle of operation.

Turning now from the embodiment shown in Figures 4 and 5, in which the tracks 24a are disposed above the roof level of the car to the embodiment shown in Figure 6, the tracks 24b there shown are disposed below the level of the roof of the car and in fact, akin to the track 24 of Figure 3, are disposed at or below ground level. As here shown, the travelling units, each comprising a carriage 34 and a manifold 37, are essentially the same as the carriage 34 and manifold 37 depicted in the embodiment of FIG. 4, the guide means 22 includes a pair of track segments 24b, each guiding one of the travelling units.

Two sets of hoses 82 and 83 and power supply cables 101 are provided, each running along a trough 116 essentially the same as the trough 116 of the embodiment of FIGS. 3 and 11. As in the preceding embodiments, positive stop means 31 are provided at each of the ends of each of the tracks 24b both to actuate the reversing means 32 and control means 42 and to absolutely prevent overrun of the carriage beyond the ends of the tracks. As mentioned above, it is preferred to operate the travelling units approximately symmetrically opposite each other on their tracks to avoid interference with each other at the common corners. This embodiment may also be provided with a guide means 22 still further segmented than that shown and additional travelling units to increase its speed of operation or to provide additional washing for the end areas of the car or both.

It will be noted that with the cycle of operation provided here, that is, three completed circuits of the car 23, one circuit spraying a wash fluid and two circuits spraying clear rinse water, the travelling unit or spray means 29 will terminate the complete cycle of operation at opposite ends of the track 24 from one cycle to the next. Since the two ends of the track 24 are located at a corner of the track, the spray means 29 in all four of the embodiments shown always ends such travelling at a corner, so that the automobile has a free path to drive forward out of the carwash 21. Should the cleansing cycle be expanded to include an additional step, such as a preliminary wetting fluid before the wash fluid or a final wax fluid after the rinse, the spray means 29 would then return to the same end of the track on each cycle of operation. Because of the limited degree of torsion applied to the supply hoses 82 and 83 and the power supply cable 101, amounting in the embodiment of FIG. 1 to a maximum of one-half turn, no swivel joint need be used b between the hoses 82 and 83 and the supply arch 84, so that a considerable saving in both initial and maintenance costs results.

Due to the positive stop means 31, there is no chance that the carriage 34 will ride beyond its intended limits at the ends of the track 24 and thus no danger that unacceptable degrees of torsion will be applied to the supply hoses or the power supply cable. Any failure of the spray means 29 to reverse its motion at the ends of the track will merely leave the spray means idling at the end of the track 24 and will not result in any disruption of the timing or synchronism of the apparatus. If desired an appropriate slip clutch may be incorporated in the power drive train at an appropriate location between the motor 62 and the drive wheel 93 to prevent motor overload in such situations. Failure of reversal of the carriage motion is extremely unlikely, however, since the reversal is positively associated with the arrival of the carriage 34 at the end of the track 24. As may be seen in Figure 12, it is the motion of the carriage 34 toward the positive stop means 31 at the end of the track 24 which pushes the bar 36 to operate the reversing limit switch 33.

Since the control means 42 and reversing means 32 are enclosed within the housing of the carriage 34, they are rendered less vulnerable to malicious mischief and vandalism. Their location below floor level in the embodiments of FIGS. 3 and 6 together with the location below floor level of the hoses 83 and 83 in the power supply cable 101 in those embodiments further enhances the resistance of the carwash apparatus to malicious damage. If desired, portions of the support platform 112 may be made hinged for access to the trough 116 and to the lower portions of the carriage 34. Additional details of operation, such as the provision of a treadle switch operated by the presence of the car 23 to begin the washing cycle, and a coin acceptor so that the operation of the device may be essentially unattended may be found in the copending application cited above.

From the foregoing it may be seen that an automatic carwash apparatus has been provided which cleans and rinses the exterior surface of an automobile rapidly and efficiently while greater reliability and economy are achieved through the elimination of an electrical and plumbing swivel structures, and carriage overrun of the desired stop points and failure to reverse carriage motion are positively prevented.

I claim:
1. A carwash apparatus, comprising
   guide means surrounding substantially the entire periphery of a car to be washed and having two ends,
   spray means mounted for traversing movement along said guide means from one end to the other and back and formed for directing a spray of liquid against the car to be washed, and
   positive stop means mounted adjacent each end of said guide means,
   wherein said spray means is formed for directing a plurality of liquids through said spray, and a control means is provided responsive to said traversing movement for causing said spray means to direct selected liquids of said plurality against the car.

2. A carwash apparatus as described in claim 1 and wherein said spray means comprises a carriage movable along said guide means, a spray manifold borne by said carriage and formed for directing spray simultaneously at the top and sides of the car, and drive means for propelling said carriage along said track.

3. A car wash apparatus as described in claim 2 and wherein said spray manifold comprises a generally L-shaped manifold attached to said carriage and disposed with one arm of said manifold extending above a portion of the car being washed and the other arm of said manifold being disposed generally vertically parallel to the side of the car, said manifold bearing spray nozzles along both of said arms communicating with said manifold to direct liquid sprays against the car.

4. A carwash apparatus, comprising
   a guide means surrounding substantially the periphery of a car to be washed and having two ends,
   spray means mounted for transversing movement along said guide means from one end to the other and back and formed for directing a spray of liquid against the car to be washed,
   positive stop means mounted adjacent each end of said guide means, said spray means comprising
   a carriage movable along said guide means,
   a spray manifold borne by said carriage and formed for directing spray simultaneously at the top and sides of the car, and
   drive means for propelling said carriage along said track, and wherein said spray means is formed for changing the angle at which the spray of liquid is directed against the surface of the car in a fashion reciprocating back and forth about the axis of said manifold as said spray means traverses said track.

5. A carwash apparatus as described in claim 1 and wherein said guide means comprises a two-ended track disposed above the roof level of the car.

6. A carwash apparatus as described in claim 5 and wherein said track is disposed substantially within a horizontal plane.

7. A carwash apparatus as described in claim 1 and wherein said guide means comprises a two-ended track disposed in a horizontal plane below the level of the roof of the car.

8. A carwash apparatus comprising
   a generally loop-shaped guide means surrounding substantially the entire periphery of a car to be washed and having two juxtaposed ends,
   spray means mounted for traversing movement along said guide means from one end to the other and back and formed for directing a spray of liquid against the car to be washed, and
   positive stop means mounted adjacent each end of said guide means,
   wherein said guide means comprises a plurality of two-ended tracks, with each track generally encircling a portion of the circumference of the car, and said spray means includes a pair of carriages, one mounted on each of said tracks for reciprocating traversal thereon from one of said ends to the other and each having a manifold mounted thereon, said manifolds each having a plurality of spray nozzles arrayed thereon and communicating with said manifold for impingement of a spray of fluid against the surface of the car, and
   wherein said tracks are disposed in a substantially horizontal plane below the level of the axles of the car.

9. A carwash apparatus as described in claim 1 and wherein said carwash further comprises reversing means for reversing the direction of travel of said spray means along said guide means upon encounter of said spray means with said positive stop means.

10. A carwash as described in claim 9 and wherein said reversing means comprises a limit switch actuated by movement of said spray means with respect to said guide means in the vicinity of said positive stop means.